United States Patent
Pirkle et al.

(10) Patent No.: US 12,455,250 B2
(45) Date of Patent: Oct. 28, 2025

(54) OBJECT DETECTION AND CHARACTERIZATION USING DUAL ENERGY BACKSCATTER TECHNIQUE

(71) Applicant: Battelle Memorial Institute, Columbus, OH (US)

(72) Inventors: Wesley C. Pirkle, New Albany, OH (US); Richard J. Davis, Hilliard, OH (US); John P. O'Brien, Worthington, OH (US)

(73) Assignee: Battelle Memorial Institute, Columbus, OH (US)

( * ) Notice: Subject to any disclaimer, the term of this patent is extended or adjusted under 35 U.S.C. 154(b) by 385 days.

(21) Appl. No.: 18/315,220

(22) Filed: May 10, 2023

(65) Prior Publication Data

US 2023/0366839 A1 Nov. 16, 2023

Related U.S. Application Data

(60) Provisional application No. 63/340,073, filed on May 10, 2022.

(51) Int. Cl.
*G01N 23/00* (2006.01)
*G01N 23/04* (2018.01)
*G01N 23/083* (2018.01)
*G01N 23/203* (2006.01)

(52) U.S. Cl.
CPC ........... *G01N 23/203* (2013.01); *G01N 23/04* (2013.01); *G01N 23/083* (2013.01)

(58) Field of Classification Search
CPC ...................... G01N 23/203; G01N 2223/053
See application file for complete search history.

(56) References Cited

U.S. PATENT DOCUMENTS 8,855,268 B1 * 10/2014 Safai ................... G01N 23/203
378/197
2023/0251209 A1 * 8/2023 Bendahan .............. G01V 5/222
378/62

FOREIGN PATENT DOCUMENTS

AU 2012101916 A4 10/2014

* cited by examiner

*Primary Examiner* — Dani Fox
(74) *Attorney, Agent, or Firm* — Grossman, Tucker, Perreault & Pfleger, PLLC; Edmund P. Pfleger

(57) ABSTRACT

The present disclosure provides a dual energy backscatter system that uses low energy and high energy radiation sources for object detection, characterization, and defect detection. The dual energy backscatter system may also be used to determine the internal structure of the object. The dual energy backscatter system may be used to detect objects underwater, including objects buried or partially buried in sand or sediment.

24 Claims, 4 Drawing Sheets

- NINE LOCATIONS
  1. Sand – Far from object
  2. Sand – Close to box
  3. Box – No Object
  4. Box – Polyethylene
  5. Box – Copper
  6. Box – Polyethylene
  7. Box – No Object
  8. Sand – Close to box
  9. Sand – Far from box Constant Height – 0.28" from Object, 3" from sand
Constant Distance – 3" from Object, 3" from sand

OBJECT DETECTION AND CHARACTERIZATION USING DUAL ENERGY BACKSCATTER TECHNIQUE

CROSS-REFERENCE TO RELATED APPLICATIONS

The present application claims the benefit of U.S. Provisional Application Ser. No. 63/340,073 filed May 10, 2022, which is hereby incorporated by reference in its entirety.

TECHNICAL FIELD

The present disclosure relates to object detection and characterization using dual energy backscatter techniques.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications, and variations thereof will be apparent to those skilled in the art.

DETAILED DESCRIPTION

The present disclosure provides dual energy backscatter techniques for object detection and characterization. In some embodiments described herein, dual energy backscatter systems and methods are provided for underwater identification of objects. The systems and methods provided herein may be utilized, for example, by industries such as oil and gas and telecommunications to identify and characterize pipelines and cables running across the ocean floor. The systems described herein may be mounted on an underwater autonomous vehicle to scan the sea floor, thus reducing cost and increasing speed analysis of man-made structures and items. In one example embodiment, low energy x-rays (e.g., 120 keV-175 keV) are used to locate items on the sea floor, and high energy x-rays (>500 keV) to determine internal structure and/or material characteristics of the object.

Figure 1:
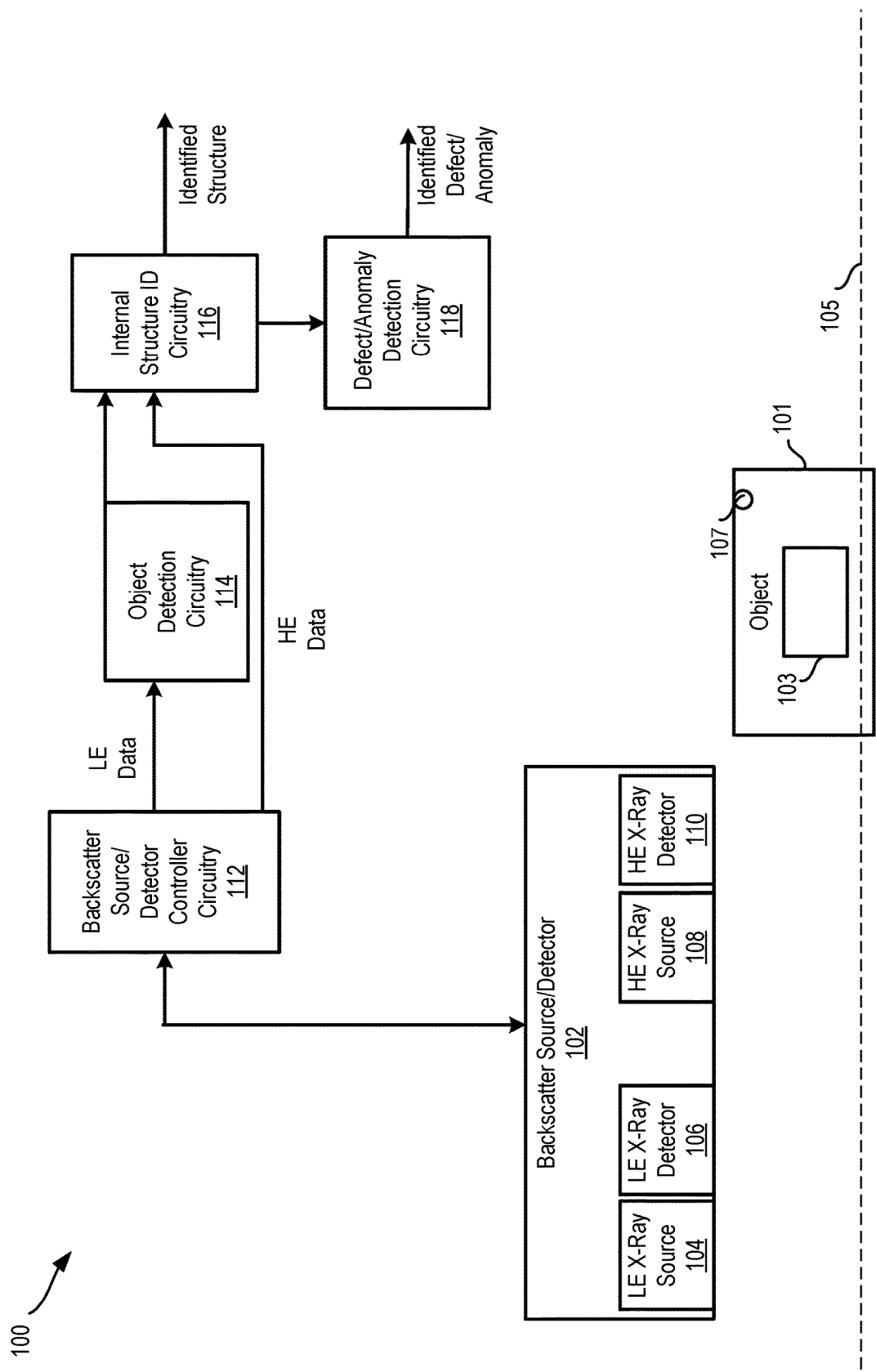
FIG. 1 illustrates a dual energy backscatter system in accordance with several embodiments of the present disclosure.

FIG. 1 illustrates a dual energy backscatter system 100 ("backscatter system 100") in accordance with several embodiments of the present disclosure. As a general overview, the backscatter system 100 provides mechanisms to determine backscatter energy profiles to detect/locate underwater objects (e.g., objects laying on a seabed, which may be wholly or partially buried in sand/sediment) using low energy radiation backscatter techniques by measuring a change in the collected backscatter signal as the object is scanned. As used herein, "low energy radiation" is generally defined as radiation energy (e.g., x-ray energy, gamma energy), which in some embodiments is defined in an energy range of 50 keV to 500 keV. Selection of the energy strength of the low energy radiation may be based on, for example, expected radiation penetration and backscatter for a given operating environment, expected radiation penetration and backscatter for a given object type, size or material properties, etc. Once an object is identified and/or detected, the backscatter system 100 of the present disclosure also provides mechanisms to determine internal structures of the object and/or determine defects and/or anomalies associated with the object using high energy backscatter techniques. As used herein, "high energy radiation" is generally defined as radiation energy (e.g., x-ray energy, gamma energy), for example, in the range of 350 keV or greater. Selection of the energy strength of the high energy radiation may be based on, for example, expected radiation penetration and backscatter for a given operating environment, expected radiation penetration and backscatter for a given object type, size or material properties, etc.

The backscatter system 100 includes an underwater backscatter source/detector 102 generally configured to detect both low energy x-ray backscatter and high energy x-ray backscatter reflected from the underwater environment including a sea floor 105 and/or an object 101 laying on the sea floor 105 (and or buried or partially buried under the sea floor 105). The backscatter source/detector 102 includes a low energy (LE) x-ray source ("LE source") 104, an LE x-ray detector 106, a high energy (HE) x-ray source ("HE source") 108, and an HE x-ray detector 110. The LE source 104 may include a controllable windowing structure to control x-ray energy emitted by the LE source 104. The LE source 104 may include radioactive material that provides x-ray energy in a selected energy range, for example LE source 104 may include Se75 as an x-ray source providing x-ray energy in the range of 110 keV-150 keV. Of course, in some embodiments, the LE source 104 may include other radioactive material selected to provide other x-ray energies, for example x-ray energies of 200 keV, 300 keV, etc. In other embodiments, the LE source 104 may include proprietary and/or off-the-shelf x-ray tube structures to provide x-ray energy in a selected range, for example, 110 keV-150 keV. The LE x-ray detector 106 includes controllable detector circuitry to detect low energy x-ray backscatter emitted from the LE source 104 and reflected off of, for example the seabed 105 and/or the object 101.

Similarly, The HE source 108 may include a controllable windowing structure to control x-ray energy emitted by the HE source 108. The HE source 108 may include radioactive material that provides x-ray energy in a selected energy range, for example HE source 108 may include Cs137 as an x-ray source providing x-ray energy in the range of greater than 500 keV. Of course, in some embodiments, the HE source 108 may include other radioactive material selected to provide other x-ray energies, for example x-ray energies of greater than 1 MeV, 2 MeV, etc. In other embodiments, the HE source 108 may include proprietary and/or off-the-shelf x-ray tube structures to provide x-ray energy in a selected range, for example, greater than 500 keV. The HE x-ray detector 110 includes controllable detector circuitry to detect high energy x-ray backscatter emitted from the HE source 108 and reflected off of, for example the sea bed 105 and/or the object 101.

As is known, backscatter energy is generally a function of the density of material being exposed to x-rays. As a general matter, backscatter energy received by detectors 106/110 remain relatively constant as the source/detector is moved over the sea bed 105 having relatively homogenous surface features. However, as source/detector 102 approaches an object, the detected backscatter energy changes due to density differences between the object and the sea bed, geometry of the object, etc. According to the teachings herein, the density of the object 101 may be greater or less than the surrounding sea bed 105. Thus, as the backscatter source/detector 102 moves over the object 101, a LE backscatter profile and/or HE backscatter energy profile will increase or decrease. The object 101 may also include an internal structure 103 that may have a density that is greater than or less than other portions of the object 101, and will thus generate a different backscatter energy profile than other portions of the object 101, as will be described below.

The backscatter system 100 also includes backscatter source/detector controller circuitry 112. The controller circuitry 112 is generally configured to control the LE source 104 and HE source 108 to enable/disable the sources 104/108 and/or control an amount of x-ray energy emitted from the sources 104/108. In addition, controller circuitry 112 is configured to receive backscatter energy information from detectors 106/110, for example, LE backscatter energy information (LE data) and HE backscatter energy information (HE data).

The backscatter system 100 also includes object detection circuitry 114 generally configured to detect the presence of an object 101 based on LE data received from the source/detector 102. As stated above, the object 101 may be formed of material that has a greater or lesser density than the surrounding seabed 105 and sea water. As the source/detector 102 moves over the object 101, the backscatter energy changes from the background backscatter energy. Thus, in some embodiments, the object detection circuitry 114 is configured to compare received LE data to one or more LE threshold energy levels to detect the presence of the object. The LE threshold may be a percent change of backscatter energy, for example, 10% change in backscatter energy. If the LE data exceeds the LE threshold (meaning that the backscatter energy has changed more than the threshold), the object detection circuitry 114 may generate an indication (object detected flag) to controller 112. The LE threshold may be selected based on, for example, an expected density of the object (compared to the surrounding seabed 105), the sensitivity of the LE detector 106, an energy density of the emitted LE x-rays, etc. In some embodiments, multiple LE thresholds may be used to distinguish among a variety of man-made objects that that mat be present on the seabed 105, for example, where each object has a unique density.

In other embodiments, the object detection circuitry 114 may be configured to compare the LE data to a reference LE energy profile that corresponds to an energy profile associated with the object (or similar objects). In still other embodiments, the LE data may be compared to trained energy profile data. The trained energy profile data may be derived from, for example, a multi-nodal neural network in which known energy profiles for various objects are used to train a machine learning model (and such training may include assigning energy profiles and/or parts thereof to weighted nodes of a neural network, such as a convolution neural network), Such an embodiment may enable, for example, automated object detection and classification, Once the object 101 is detected, the controller 112 may cause the source/detector 102 to reposition over the object 101, and enable the HE x-ray source 108 and HE x-ray detector 110 to scan the object 101 using HE x-rays to gather additional information concerning the object 101, as described below.

The backscatter system 100 also includes internal structure identification circuitry 116 ("ID circuitry 116") generally configured to determine one or more characteristics of the internal structure of the object 101 using HE data. As noted above, the object 101 may include an internal structure 103 (e.g., copper wire surrounded by an insulator, etc.) that has a different density compared to the external structure of the object 101. Thus, in some embodiments, the ID circuitry 116 is configured to compare received HE data to one or more HE threshold energy levels to detect the presence of the internal structure 103 of the object 101. The HE threshold may be a percent change of backscatter energy, for example, 25% change in backscatter energy. If the HE data exceeds the HE threshold (meaning that the backscatter energy has changed more than the threshold), the ID circuitry 116 may generate an indication (internal structure flag) to controller 112. The HE threshold may be selected based on, for example, an expected density of the internal structure 103 of the object (compared to the external structure of the object 101), the sensitivity of the HE detector 110, an energy density of the emitted HE x-rays, etc. In some embodiments, multiple HE thresholds may be used to distinguish among a variety of internal structures of an object, for example, where each internal structure has a unique density.

In other embodiments, the ID circuitry 116 may be configured to compare the HE data to a reference HE energy profile that corresponds to an energy profile associated with the object (or similar objects). In still other embodiments, the HE data may be compared to trained energy profile data. The trained energy profile data may be derived from, for example, a multi-nodal neural network in which known energy profiles for various objects are used to train a machine learning model (and such training may include assigning energy profiles and/or parts thereof to weighted nodes of a neural network, such as a convolution neural network), Such an embodiment may enable, for example, automated object detection and classification.

In some embodiments, in addition to object detection and internal structure identification, the backscatter system 100 may be configured to detect an anomaly related to the object 101. An anomaly may include, for example, a crack, hole, tear, break, and/or other defect associated with the object 101. Accordingly, the backscatter system 100 may also include defect/anomaly detection circuitry 118 generally configured to detect defects, e.g., crack 107, of the structure of the object 101 using HE data. Once the source/detector 102 is positioned over the object 101, the LE and HE data (although changed from the surrounding environment) typically remains relatively constant until the source/detector 102 moves past the object. However, a defect or anomaly associated with the object may cause a sudden "spike" in the backscatter energy (e.g., backscatter energy will sharply increase or decrease). The defect/anomaly detection circuitry 118 is configured to detect sudden changes in the HE data, and such sudden change may indicate the presence and position of defect or anomaly. As used here, "sudden change" may be a change of 10% or more in the HE data.

Figure 2:
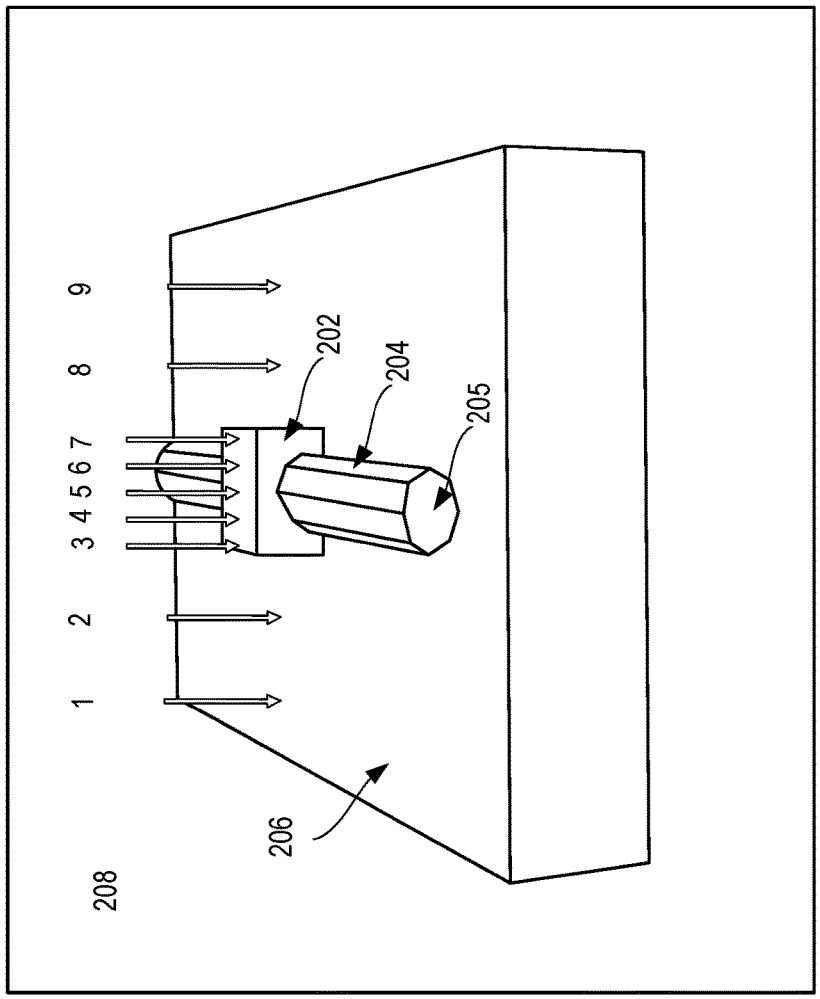
FIG. 2 illustrates a simulation example according to one embodiment for detecting and characterizing an object using the dual energy backscatter techniques described herein.

FIG. 2 illustrates a simulation example 200 according to one embodiment for detecting and characterizing an object using the dual energy backscatter techniques described herein. In this simulation example, a metal box 202 having a polyethylene cable 204 running through it is disposed on sand 206 in a fluid environment 208. The polyethylene cable 204 includes a copper core 205. A dual energy x-ray source/detector (not shown in this Figure, e.g., source/detector 102 of FIG. 1) is moved over the object from left to right. Nine (9) sample pots using both high energy x-ray backscatter and low energy x-ray backscatter are taken as the source/detector moves from left to right. The source/detector remains approximately 0.28" from the object (and approximately 3" from the sand). Sample point 1 represents a sample of the sand away from the object (e.g., at least several inches away from the object). Sample point 2 represents a sample of the sand near the object (e.g., 1-2 inches from the object. Sample points 3-7 represent sample points taken directly over the object (from left to right). Sample points 8 and 9 are sample points near and away from the object, respectively.

Figure 3B:
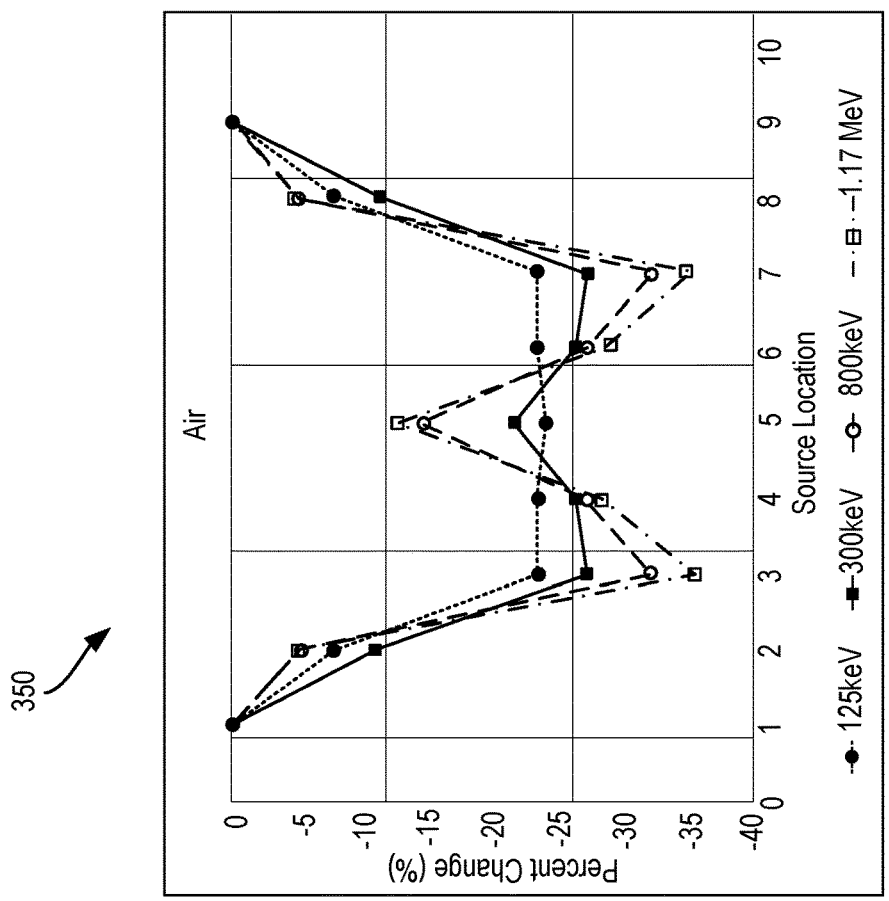
FIG. 3B illustrates the backscatter energy profile for various x-ray energies of the simulation example of FIG. 2 where the fluid environment is air.
Figure 3A:
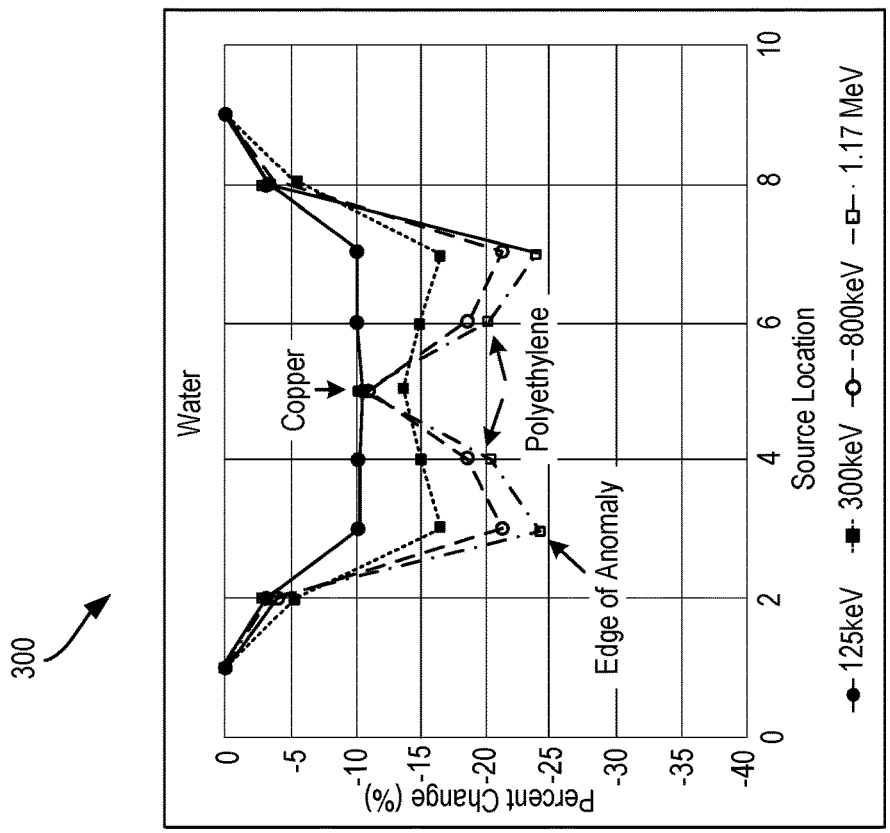
FIG. 3A illustrates the backscatter energy profile for various x-ray energies of the simulation example of FIG. 2 where the fluid environment is water.

FIG. 3A illustrates the backscatter energy profile 300 for various x-ray energies of the simulation example of FIG. 2 where the fluid environment is water. The x axis represents the nine (9) sample points illustrated in FIG. 2, and the y axis represents the change (in percentage) of backscatter energy received by the detector. The x-ray energies used for this simulation include low energy x-ray sources at 125 keV and 300 keV, and high energy x-ray sources at 800 keV and 1.17 MeV. At sample point 1 (away from the object over sand), the backscatter energy from both the low and high energy x-ray sources has a largely undiminished value, represented as 0% change in backscatter energy. At sample point 2 (over sand and near the object), the change in backscatter energy begins to manifest for both low energy and high energy x-ray sources, representing an approximate 3-5% decrease in backscatter energy detected.

At sample point 3, representing the edge of the object, the detected backscatter energy decreases significantly. In the case of the low energy x-ray sources, the decrease in detected backscatter energy is 10% and 17%, respectively; and for the high energy x-ray sources the decrease in detected backscatter energy is 22% and 25%, respectively. As noted above, this change is due to changes in density between the object and the sand, as well as changes in geometry between the object and the sand (i.e., the right angle at the edge of the object may cause excessive decrease detected backscatter energy due to increased x-ray reflections away from the detector). At sample point 4, the backscatter energy increases, since the effects of geometry change becomes less. The sample point 4 represents backscatter energy from the polyethylene cable alone (not the copper core of the cable). The sample point 5 represents backscatter energy from the copper core of the polyethylene cable. Sample points 6, 7, 8, and 9 are similar to sample points 4, 3, 2, and 1, respectively.

The 125 keV low energy x-ray source produces a backscatter energy profile that reduces significantly at the "first" edge of the object (sample point 3) and increases significantly at the "back" edge of the object (starting after sample point 7), and remains relatively constant while over the object. Similarly, the 300 keV low energy x-ray source produces a backscatter energy profile the reduces significantly at the "first" edge of the object (sample point 3) and increases significantly at the "back" edge of the object (starting after sample point 7), and remains relatively constant while over the object. At 300 keV, a slight increases in backscatter energy is detected at point 5, representing the copper core. Thus, the backscatter energy profiles using low energy x-ray sources are sufficient to detect and distinguish the man-made object on a sea floor environment, but insufficient to identify internal details of the object.

In contrast to the low energy backscatter profiles, both the 800 keV and 1.17 MeV high energy x-ray sources produce a backscatter energy profile that reduces significantly at the "first" edge of the object (sample point 3), increases at the edge of the polypropylene (point 4), then increases significantly at the copper core (point 5). Thus, the backscatter energy profiles using high energy x-ray sources are sufficient to identify the internal structures of a polypropylene cable having a copper core on sea floor environment.

FIG. 3B illustrates the backscatter energy profile 350 for various x-ray energies of the simulation example of FIG. 2 where the fluid environment is air. The backscatter profile 350 is similar to the backscatter profile 300, described above, but the backscatter energy changes are more pronounced in air.

Figure 4:
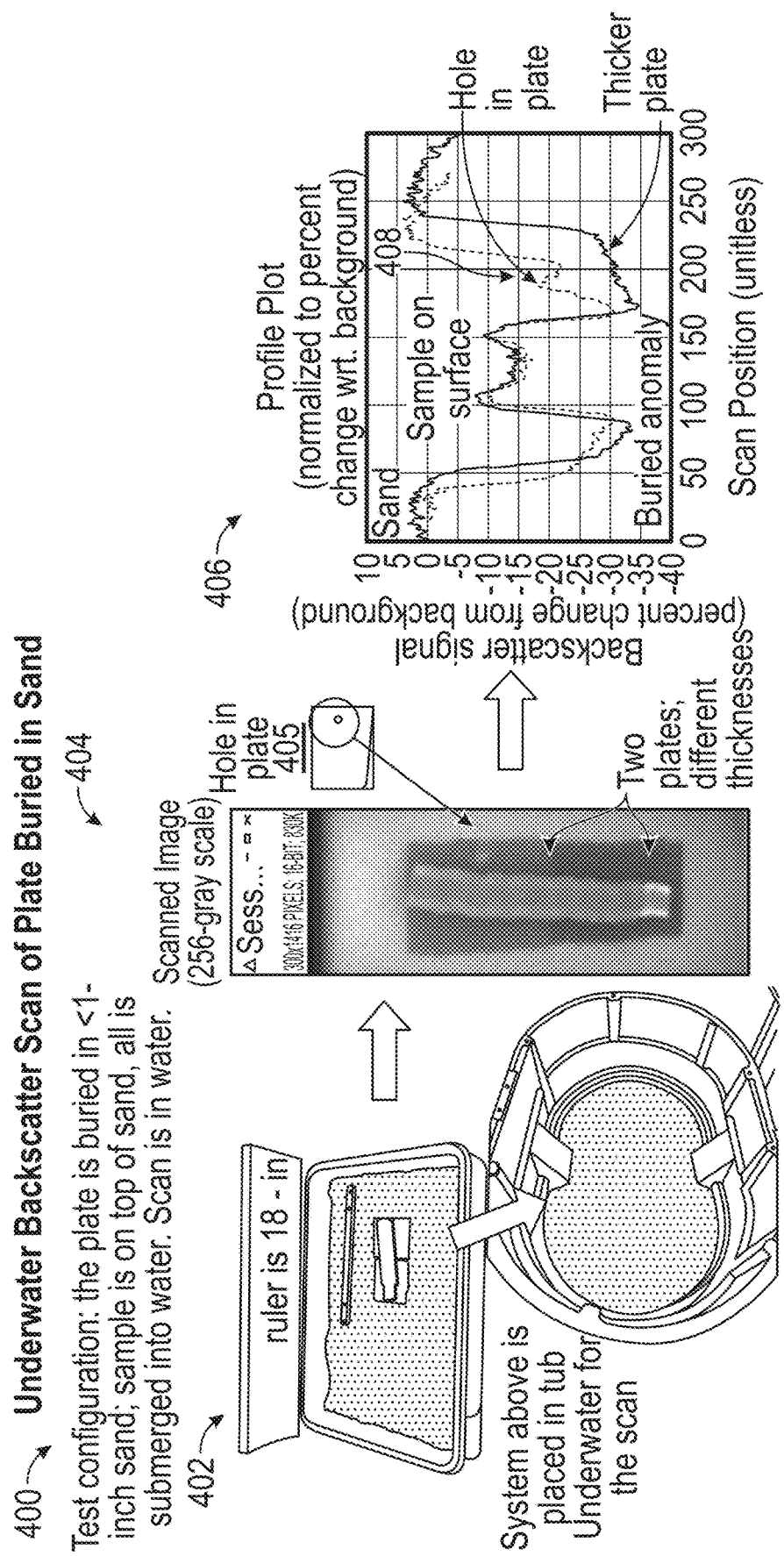
FIG. 4 illustrates a simulation example according to another embodiment for detecting and characterizing an object using the dual energy backscatter techniques described herein.

FIG. 4 illustrates a simulation example 400 according to another embodiment for detecting and characterizing an object using the dual energy backscatter techniques described herein. In this simulation example, a metal plate is buried in sand, as shown at 402. An x-ray image 404 of the scanned object identifies a hole (defect) in the plate, as shown at 405. The backscatter energy profile is shown in the plot at 406 for both high energy x-rays (orange) and low energy x-rays (blue). Of note, the sudden change in backscatter energy at 408 indicates the defect 405 in the plate.

While the foregoing is largely directed to describing backscatter object detection and classification using changes in backscatter energy, in other embodiments, machine learning techniques may be used with radiographic images to detect and classify objects based on received backscatter radiation. As with the previous embodiments, the dual energy backscatter approach described herein provides for several outcomes. First, the low-energy radiation allows detection of the buried object and reconstruction the geometric outline of its physical surface. Second, once detected, the high-energy radiation allows a geometric reconstruction of the object's internal components with the assumption that the components are not obscured via radiographically opaque objects. The following description is directed to a process for determining object type and defect detection using LE image data and HE image data, in conjunction with a trained model of LE images and HE images using, for example machine learning techniques (e.g., convolution neural network). The trained image may be parsed into individual pixels (or groups of pixels) that are used to distinguish an object of interest over background information. The process described below is generally based on a dual-energy subtraction methodology which takes advantage of differences in the degree to which different materials will reflect (backscatter) radiation as a function of energy.

The dual-energy backscatter process involves acquiring backscatter images at low-energy and high energy. The choice of high/low energies may be made based on, for example, expected radiation penetration and backscatter for a given operating environment, expected radiation penetration and backscatter for a given object type, size or material properties, etc. It should be noted that, unlike through-thickness radiography, at low-energy, the majority of an image (backscatter image) from an object is almost due entirely to its surface materials.

In some embodiments, the process may assume that the radiation output and the backscatter behavior of the object are known, as may be derived from one or more training images. The low- and high-energy images are aligned by image pixel number (location). The process may be applied to each pixel pair, from which an average material property of an internal component in that pixel is determined.

To determine the surface material, it may be assumed that the low-energy backscatter signal is from the surface material only. Although an approximation, it suffices as an indication of the surface material of the object.

$$IL = \mu SL + \mu IL \sim SL; \text{ where } \mu IL << \mu SL$$

where:
- $\mu SL$ is the backscatter coefficient of surface material at the lower (L) energy, and
- $\mu IL$ is the backscatter coefficient of inner material at the lower (L) energy.

Using pre-existing backscatter tables related to image intensity (normalized to the specific system) as a function of energy, the surface material can be determined.

For each pixel pair, the backscattered image intensity acquired at the lower (L) energy and following logarithmic transformation (IL) is given by:

$$IL = \mu SL + \mu IL,$$

where $\mu IL$ is placed back into the equation (even though it may be very negligible compared to $\mu SL$).

Similarly, the logarithmic transformation of the backscattered radiation intensity (IH) for the pixel number of an image acquired at a high-energy is given by:

$$IH = \mu IH + \mu SH$$

where:
- $\mu IH$ is the backscatter coefficient of inner material at the high (L) energy, and
- $\mu SH$ is the backscatter coefficient of surface material at the higher (H) energy.

The value of SH may be determined once the surface material has been identified.

The two images (IL and IH) are multiplied by their respective weighting factors, kL and kH and combined to form a composite dual-energy backscatter image (IDE), given by:

$$IDE = kL \, IL + kH \, IH.$$

Therefore:

$$IDE = (kL\mu SL + kH\mu SH) + (kL\mu IL + kH\mu IH), \quad (1)$$

The coefficients are chosen so to cancel the image information from the surface material, leaving only the image information due to the inner component's material. So, the sum of surface components in the above equation are set equal to zero, i.e.

$$kL\mu SL + kH\mu SH = 0.$$

Thus, $$kL\mu SL = -kH\mu SH,$$

and $$\mu SL/\mu SH = -kH/kL$$

which indicates that surface material information can be suppressed from the composite image when the ratio of weighting factors in equation (1) above is chosen to equal the negative of the ratio of the backscatter coefficients of the surface material at the low- and high-energies.

The dual energy image (IDE) becomes only a function of the inner material:

$$IDE = (kL\mu IL + kH\mu IH)$$

The coefficient $\mu IL$ is generally negligible compared to $\mu SL$ However, it may not be negligible relative to $\mu IH$.

Note, the surface information can never be completely eliminated, because the coefficients are an average over the energy ranges of the low and high (in cases for an x-ray tube) and the thickness (T) of the surface material. But, depending on the specific energy levels chosen, an optimal ratio value can be obtained using the variational principle.

$$\delta \int_{\Delta_L}^{V,T} \frac{\mu_{SL}}{\mu_{SH}} \partial V \partial T = 0$$

where the variation is taken over the bounds of the high and low tube voltages (V) and possible thicknesses (T). The value, $\Delta_L$, is the lower bounds for V and T. If unknown, they are set to 0.

Now, IDE is a function of only the inner material's backscatter low- and high-energy coefficients only. A variational analysis over each component is iterated until IDE is calculated is matched to its measured value. Then, the inner material can be determined.

$$\text{Iteration} \prod_{\mu(IL),\mu(IH)} I_{DE}(\text{calculated}) = I_{DE}(\text{measured})$$

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" may refer to, for example, software, firmware and/or circuitry configured to perform any of the aforementioned operations. Software may be embodied as a software package, code, instructions, instruction sets and/or data recorded on non-transitory, computer-readable storage devices. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as processors comprising one or more individual instruction processing cores, state machine circuitry, and/or firmware that stores instructions executed by programmable circuitry and/or future computing circuitry including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), application-specific integrated circuit (ASIC), programmable logic devices (PLD), digital signal processors (DSP), field programmable gate array (FPGA), logic gates, registers, semiconductor device, chips, microchips, chip sets, etc.

Any of the operations described herein may be implemented in a system that includes one or more non-transitory storage devices having stored thereon, individually or in combination, instructions that when executed by circuitry perform one or more operations. The instructions may include, for example, machine-executable code, compiled code, instructions sets, etc., and may be in the form of stand-alone instructions and/or part of a larger instruction set such as an application, operating system, virtual operating systems, etc. The circuitry may include any of the aforementioned circuitry including, for examples, one or more processors, ASICs, ICs, etc., and/or other programmable circuitry. Also, it is intended that operations described herein may be distributed across a plurality of physical devices, such as processing structures at more than one different physical location. The storage device includes any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A dual energy backscatter system, comprising:
   a backscatter source/detector having a first radiation source to emit a first radiation energy and a second radiation source to emit a second radiation energy; the backscatter source/detector having a first backscatter detector to detect first backscatter energy information associated with the first radiation source and a second backscatter detector to detect second backscatter energy information associated with the second radiation source;
   backscatter source/detector controller circuitry to control the backscatter source/detector to enable and disable the first radiation source and second radiation source and to enable and disable the first backscatter detector and the second backscatter detector; and to control a position of the backscatter source/detector with respect to an object;
   object detection circuitry to detect the man-made object; the object detection circuitry to detect a change in the first backscatter energy information as the backscatter source/detector moves closer to, and over, the object; and
   internal structure identification circuitry to detect an internal structure of the object; the internal structure identification circuitry to a change in the second backscatter energy information as the backscatter source/detector moves over the object.

2. The system of claim 1, wherein the first radiation energy is within the range of 50 keV to 500 keV.

3. The system of claim 1, wherein the first radiation source is Se75.

4. The system of claim 1, wherein the second radiation energy is greater than 500 keV.

5. The system of claim 1, wherein the second radiation source is Cs137.

6. The system of claim 1, further comprising defect detection circuitry to detect a defect of the man-made object by determining a local change in the second backscatter energy information; wherein the local change represents an increase or decrease in backscatter energy in a sample area having otherwise substantially constant backscatter energy.

7. The system of claim 1, wherein the object is a man-made object that is laying on, or partially buried under a seabed.

8. The system of claim 1, wherein the first and/or second radiation source includes an x-ray radiation source and/or a gamma radiation source.

9. A non-transitory storage device that includes machine-readable instructions that, when executed by one or more processors, cause the one or more processors to perform operations, comprising:
   cause detection of first backscatter energy information associated with a first radiation source generating a first radiation energy and cause detection of second backscatter energy information associated with the second radiation source generating a second radiation energy;
   control a backscatter source/detector to control a position of the backscatter source/detector with respect to an object;
   determine an identity of the natural or the man-made object by determining a change in the first backscatter energy information as the backscatter source/detector moves closer to, and over, the object; and
   determine an internal structure of the man-made by determining a change in the second backscatter energy information as the backscatter source/detector moves over the object.

10. The non-transitory storage device of claim 9, wherein the first radiation energy is within the range of 50 keV to 500 keV.

11. The non-transitory storage device of claim 9, wherein the first radiation source is Se75.

12. The non-transitory storage device of claim 9, wherein the second radiation energy is greater than 500 keV.

13. The non-transitory storage device of claim 9, wherein the second radiation source is Cs137.

14. The non-transitory storage device of claim 9 that includes machine-readable instructions that, when executed by one or more processors, cause the one or more processors to perform operations, further comprising:

determine a defect of the object by determining a local change in the second backscatter energy information; wherein the local change represents an increase or decrease in backscatter energy in a sample area having otherwise substantially constant backscatter energy.

15. The non-transitory storage device of claim 9, wherein the object is a man-made object that is laying on, or partially buried under a seabed, and the backscatter source/detector is for underwater detection of the man-made object.

16. The non-transitory storage device of claim 9, wherein the first and/or second radiation source includes an x-ray radiation source and/or a gamma radiation source.

17. A method, comprising:
 detecting first backscatter energy information associated with a first radiation source generating a first radiation energy;
 detecting second backscatter energy information associated with the second radiation source generating a second radiation energy;
 controlling a backscatter source/detector to control a position of the backscatter source/detector with respect to an object;
 determining an identity of the object by determining a change in the first backscatter energy information as the backscatter source/detector moves closer to, and over, the object; and
 determining an internal structure of the man-made by determining a change in the second backscatter energy information as the backscatter source/detector moves over the object.

18. The method of claim 17, wherein the first radiation energy is within the range of 50 keV to 500 keV.

19. The method of claim 17, wherein the first radiation source is Se75.

20. The method of claim 17, wherein the second radiation energy is greater than 500 keV.

21. The method of claim 17, wherein the second radiation source is Cs137.

22. The method of claim 17, further comprising:
 determining a defect of the object by determining a local change in the second backscatter energy information; wherein the local change represents an increase or decrease in backscatter energy in a sample area having otherwise constant backscatter energy.

23. The method of claim 17, wherein the object is a man-made object that is laying on, or partially buried under a sea bed, and the backscatter source/detector is for underwater detection of the natural or the man-made object.

24. The method of claim 17, wherein the first and/or second radiation source includes an x-ray radiation source and/or a gamma radiation source.

* * * * *